(12) United States Patent
Libby et al.

(10) Patent No.: US 8,820,029 B2
(45) Date of Patent: Sep. 2, 2014

(54) MODULAR FENESTRATION SYSTEM

(71) Applicant: Andersen Corporation, Bayport, MN (US)

(72) Inventors: James B. Libby, Stillwater, MN (US); David Plummer, Hudson, WI (US)

(73) Assignee: Anderson Corporation, Bayport, MN (US)

( * ) Notice: Subject to any disclaimer, the term of this patent is extended or adjusted under 35 U.S.C. 154(b) by 0 days.

(21) Appl. No.: 13/897,779

(22) Filed: May 20, 2013

(65) Prior Publication Data
US 2014/0000190 A1    Jan. 2, 2014

Related U.S. Application Data (63) Continuation of application No. 12/645,665, filed on Dec. 23, 2009, now Pat. No. 8,464,480.

(60) Provisional application No. 61/143,472, filed on Jan. 9, 2009.

(51) Int. Cl.
*E06B 3/988* (2006.01)

(52) U.S. Cl.
USPC ............... 52/745.16; 52/204.7; 52/204.51; 52/204.53; 52/204.58

(58) Field of Classification Search
CPC ............. E06B 3/00; E06B 3/54; E06B 2/885; E06B 2/5409; E06B 2/5427
USPC ......... 52/204.5, 204.51, 208, 204.53, 204.54, 52/204.57, 204.58, 204.61, 204.62, 204.7, 52/745.15, 745.16
See application file for complete search history.

(56) References Cited

U.S. PATENT DOCUMENTS

| | | |
|---|---|---|
| 1,760,265 A | 5/1930 | Carr |
| 3,103,710 A | 9/1963 | Fredricksen |
| 3,975,875 A | 8/1976 | Goss, Jr. |
| 4,076,439 A | 2/1978 | Sakashita |
| 4,811,533 A | 3/1989 | Wetsel |
| 5,485,705 A | 1/1996 | Guillemet |
| 5,625,992 A | 5/1997 | Strick et al. |
| 5,941,033 A | 8/1999 | Adams |
| 5,941,046 A | 8/1999 | Prather |
| 6,082,674 A | 7/2000 | White et al. |
| 6,148,883 A | 11/2000 | Wilson |
| 6,173,542 B1 | 1/2001 | Wright |
| 6,389,763 B1 | 5/2002 | Clauss |
| 6,449,903 B1 | 9/2002 | Borcherding |
| 6,560,944 B1 | 5/2003 | Wilson |
| D493,234 S | 7/2004 | Vastine |
| 6,807,778 B2 | 10/2004 | Engebretson |
| 6,829,865 B2 | 12/2004 | Smith |
| 7,010,888 B2 | 3/2006 | Tumlin et al. |
| 7,454,865 B2 | 11/2008 | Kerscher |
| 2004/0187408 A1 | 9/2004 | Smith |
| 2005/0050815 A1 | 3/2005 | Engebretson |
| 2005/0193654 A1 | 9/2005 | Primozich |

*Primary Examiner* — William Gilbert
(74) *Attorney, Agent, or Firm* — Womble Carlyle Sandridge & Rice LLP (57) ABSTRACT

A modular fenestration system includes a collection of standardized functional units such as double hung window units, casement window units, picture window units, transom units, and the like. The functional units all share common sightlines, common glass set-back, common interfaces, common design language, and are sized according to a unique modular or incremental sizing grid. The sizing grid specifies individual window units in terms of the rough opening size in which they are designed to be installed. Individual functional units are easily combinable in a vast array of combinations to create a large number of possible composite window units. The system also includes a collection of interior and exterior trim units, grilles, and hardware in various architectural styles that can be attached to installed standardized functional units via the common interfaces to match the architecture of a particular home or building.

10 Claims, 10 Drawing Sheets

MODULAR FENESTRATION SYSTEM

REFERENCE TO RELATED APPLICATION

This is a continuation of co-pending U.S. patent application Ser. No. 12/645,665 entitled Modular Fenestration System filed on Dec. 23, 2009, which in turn claims priority to U.S. provisional patent application Ser. No. 61/143,472 filed on Jan. 9, 2009.

TECHNICAL FIELD

This disclosure relates generally to fenestration and more specifically to a fenestration system that includes an array of individual standardized window units and an array of architectural accessories selectively attachable to the standardized window units. The standardized window units can be arranged in a large number of combinations and mulled together to form unique multi-unit windows and selected architectural accessories can be attached to define the architecture of the window.

BACKGROUND

Modern materials technology has greatly expanded the choices of architectural styles that manufacturers of building products are able to create. In particular, polymeric and composite building materials lend themselves to new production methods such as molding and extrusion techniques that result in a greater variety of configurations, shapes, and colors of building products. It is technically possible for such new materials and technologies to be used to produce building products in an almost unlimited range of architectural styles and configurations as custom crafted items. However, custom crafted building products can be prohibitively expensive for many. Meeting demand for a variety of architectural styles and combinations of architectural styles in a standardized mass produced building product line for a diverse customer base with diverse tastes is a challenge.

The challenge has been particularly acute in the fenestration or window and door industry. While custom crafted windows and doors can be made to order with any desired combination of configurations, architectural styles, and functional features, such custom crafted products are not affordable for the majority of homeowners. The fenestration industry has traditionally found standardization of window and door units to be a powerful tool in simplifying production processes for mass production, improving efficiency, and producing window and door products at reasonable prices for those unable or unwilling to afford custom crafted windows and/or doors. However, such standardized lines of windows and doors limit severely the variety and architectural choices available to consumers. Producing standardized mass produced window and door products that provide customers with a wide range of functional and architectural style options has not generally been possible. A related challenge has been to produce a line of standardized fenestration units adapted to be arranged and mulled together in a large number of possible configurations to produce compound fenestration units that are proportionally and architecturally correct and visually pleasing.

A line of windows can comprise hundreds of individual window units representing a wide array of available window configurations and a wide array of available sizes for each configuration. A large volume of associated data specifying uniquely the size and configuration of each unit available in the line must be communicated accurately to architects, building designers, and homeowners to enable them to make informed choices from the available options. Traditionally, such window units have been specified by, for example, the size of the glass or by the exterior dimensions of the window unit itself, which can result in a somewhat odd and not readily meaningful specification. Further, such specifications have not immediately conveyed meaningful information regarding, for instance, the rough opening size required for the window. Instead, designers have had to calculate such requirements and hope that their calculations are correct. This has made selection of individual window units and subsequent specification of rough framing requirements complex and time consuming. This is particularly true for compound windows that are made up of a plurality individual window units mulled together and installed in a rough opening. In such cases, the complexities and potential for costly errors are multiplied.

A need therefore exists for a system of windows and doors that successfully addresses the forgoing and other needs and shortcomings of the prior art and it is to the provision of such a system that the present invention is primarily directed.

SUMMARY

The entire contents of U.S. provisional patent application Ser. No. 61/143,472, to which priority is claimed above, is hereby incorporated by reference.

Briefly described, a modular fenestration system includes a set of standardized mass produced functional window units such as double hung window units, casement window units, picture window units, transom units, and the like. The system also includes a set of architectural elements, including interior and exterior trim units, grilles, and hardware, all of which are historically and period accurate and that also can be mass produced with modern materials and techniques. The functional units are each available in a wide variety of sizes for each unit type, which results in a large array of available functional units. The standardized functional units all share common sightlines, common glass set-back, common interfaces, and common design language. Thus, all functional units are visually compatible with all other functional units of the system and other elements of the system such as grilles and trim can be interfaced or attached to any functional unit with the same common interface. Accordingly, when multiple functional units are selected and mulled together to form a large compound functional unit, the resulting compound unit is consistent across its features, visually pleasing, mimics the look of a custom crafted window, and can be adorned with any of a variety of architecturally accurate trim units, grilles, and hardware to achieve a desired architectural look.

The functional units are sized and specified according to a unique incremental sizing strategy in which individual functional window units are specified by the unit type and rough opening size into which they should be installed (e.g. DH2436 for a double hung unit for a 24 inch by 36 inch rough opening). Therefore, the required rough opening size, or the required window unit for a known rough opening, is easily and readily determined by a designer or builder from the unit's specification. Further, the gap enforced between individual units mulled into a larger compound unit is such that the required rough opening size in a particular direction is simply the sum of the rough opening sizes of the individual functional units in that direction. Thus, determining required rough opening requirements for compound units is greatly simplified.

A tool is disclosed for aiding architects in the design, within the system, of compound window units for use in a particular application. The tool includes scale models of the individual functional units of the system and scale models of the available trim and grille units of the system. The model functional units can be arranged and assembled on an easel in a wide variety of combinations resulting in a wide variety of different compound window configurations. The configuration and appearance of each combination is readily apparent and, when the desired combination is created and selected, the full size functional units, trim units, and the like can readily be ordered.

Thus, a modular fenestration system is now provided that addresses the problems and greatly exceeds the possibilities of existing fenestration systems. These and other unique aspects, features, and advantages of the system disclosed herein will be better understood upon review of the detailed description set forth below when taken in conjunction with the accompanying drawing figures, which are briefly described as follows.

BRIEF DESCRIPTION OF THE DRAWINGS

FIG. 3 illustrates common sight lines and common sizing according to the disclosure.

FIG. 4 illustrates common glass setback and common sill design according to principles of the disclosed system.

DETAILED DESCRIPTION

The modular fenestration system will now be described in more detail with reference to the above drawing figures, wherein like parts, where appropriate, may be identified with like reference numerals throughout the figures.

Figure 1:
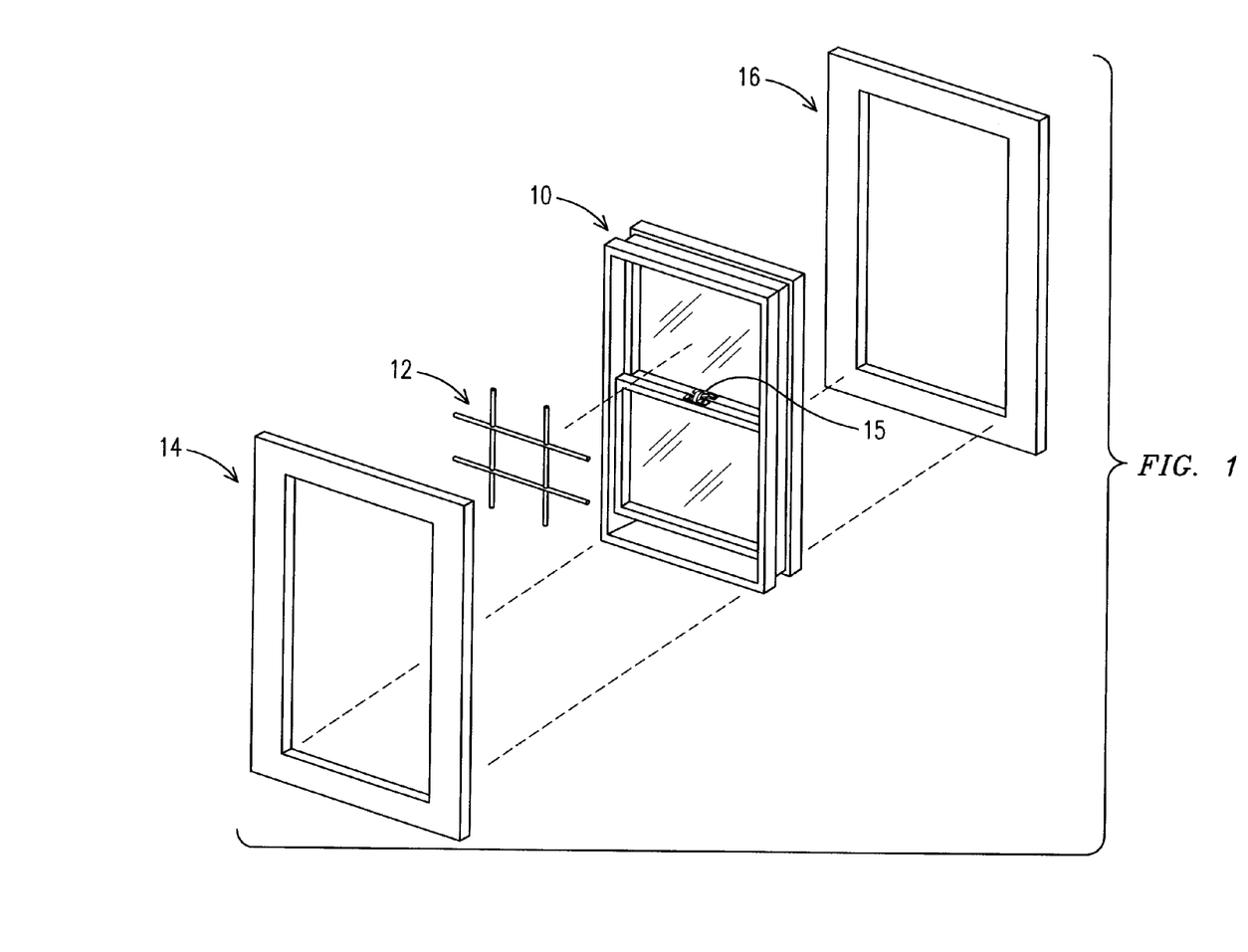
FIG. 1 is an exploded perspective view of a generic functional fenestration unit, grille, and interior and exterior trim that embodies principles of the disclosed system in a preferred form.

Referring to FIG. 1, the modular fenestration system comprises a collection of individual functional units of different types such as, for instance, double hung units, casement units, picture window units, transom units, arched units, and the like. One such functional unit, a double hung window unit in this case, is represented by unit 10 in FIG. 1. Each functional unit 10 of the system is standardized so that the functional units can be mass produced efficiently and cost effectively. Further, all functional units of the system have common physical features, including common sight lines, common glass setback, common interfaces, and common design language, all of which are described in detail below. The same collection of functional units is common to and forms the basic platform of the modular fenestration system of the invention. Functional units are made so that multiple functional units can easily be arranged and mulled together in a wide array of configurations to form a correspondingly wide array of compound functional units to suit virtually any design need. Because of the common physical features mentioned above, a resulting compound functional unit is visually consistent throughout and mimics the look of a much more expensive custom crafted window unit.

The modular fenestration system further includes a collection of distinct architectural packages that may include interior trim units, represented generically by trim unit 14 in FIG. 1, exterior trim units, represented generically by trim unit 16 in FIG. 1, grille units, represented generically by grille unit 12, and hardware, represented generically by latch 15 in FIG. 1. Each architectural package is carefully researched and constructed to be a historically and period accurate reproduction of a particular architectural style such as, for example, Old World, Colonial, Arts and Crafts, Victorian, Modern, and others. The architectural packages also are capable of mass production, preferably using modern materials such as wood and polymer composites and modern techniques such as extrusion and molding. Thus, the architectural packages also can be fabricated efficiently and cost effectively, but nevertheless have the appearance of finely crafted custom wooden adornments. Further, the architectural packages are all attachable to any individual or compound functional unit by attachment mechanisms, such as clips for example, that are compatible with the common interfaces of the functional units, as described in more detail below. It will thus be seen that a very large array of windows and architectural styles can be created by architects and designers by mixing and matching the functional units and architectural packages of the modular fenestration system disclosed herein.

As used herein, the term functional unit will denote a single system generic fenestration unit, such as a double hung window, a casement window, a sidelight, a transom, an arched unit, and the like, containing standard and functional parts of the system. In the case of a double hung window, for example, the functional unit may include side jambs, a head jamb, a sill, jamb liners, balancers, nailing flanges, sashes, glazing, and weatherstrip. For a tilt sash window, the functional unit may further include the non-visible portions of the tilt and tilt latch mechanisms. In the case of a casement or awning window, the functional unit may include a frame, a nailing flange, a sash, weatherstrip, a hinge system, non-visible portions of an operator, and some internal parts for a locking mechanism. Visible hardware, such as latches, cranks, operator covers, and lock handles are not part of a functional unit, but instead belong to the array of architectural packages since they are not generic but vary according to a selected architectural style.

As mentioned, the modular fenestration system includes a set or platform of functional units of various configurations and types such as, for example, rectangular double hung window units, rectangular picture window units, rectangular casement window units, arched window units, eyebrow window units, triangular window units, transom units, and sidelight units. The functional units are further adapted to allow trim units of different architectural styles to be selected and attached, using common interfaces, on the interior and exterior sides of a home in which a window is installed. Thus, interior décor of the home need not be constrained by a particular choice of exterior architectural style. Some exceptions to this rule may exist in the case, for instance, of grilles, which are visible both from the interior and exterior of a window.

Figure 2:
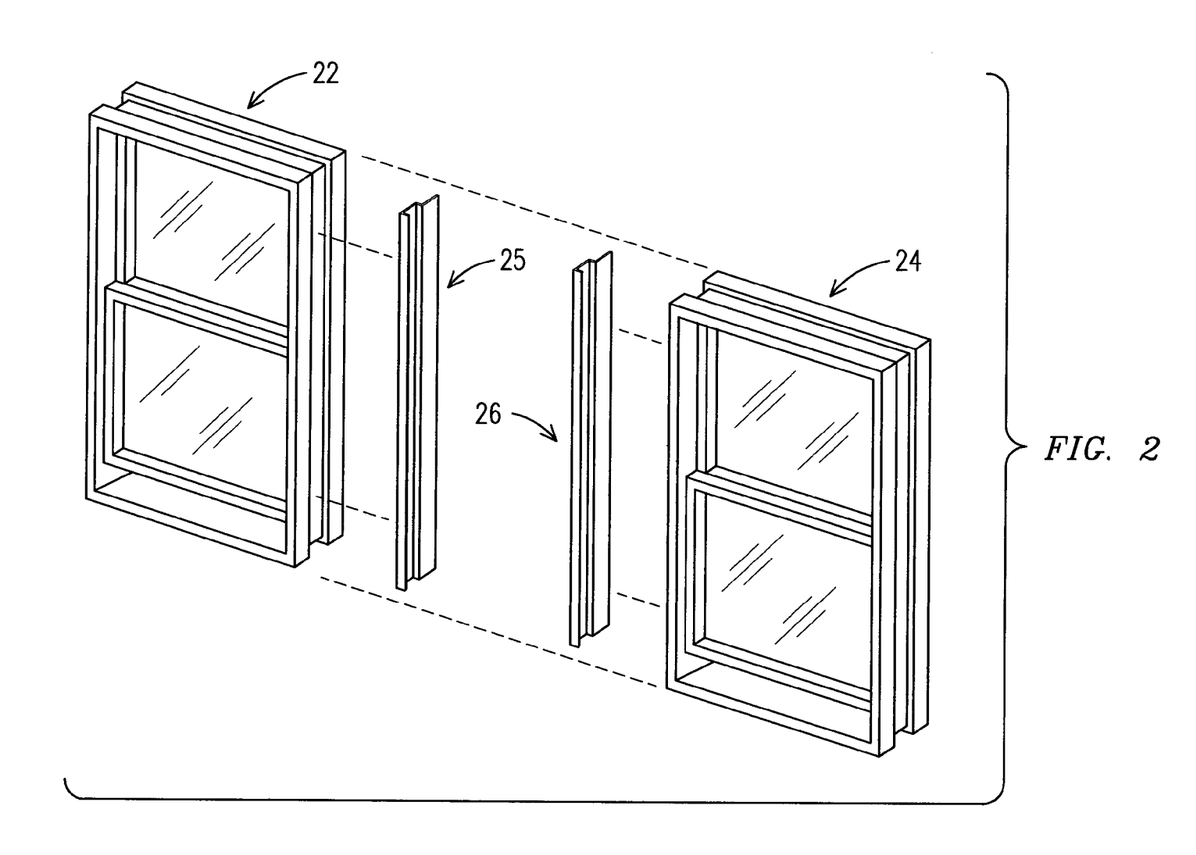
FIG. 2 is an exploded perspective illustrating the mulling together of two functional units of the system to form a compound functional unit.
Figure 3A:
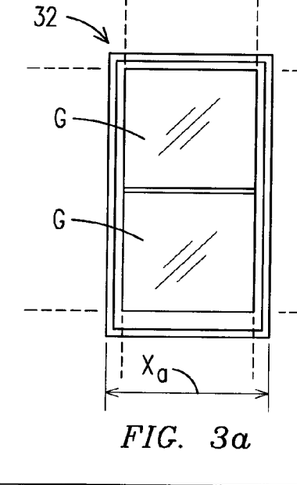
FIG. 3a illustrates a double hung functional unit according to the disclosure.
Figure 3B:
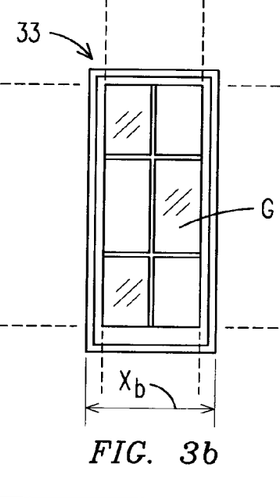
FIG. 3b illustrates a sidelight function unit according to the disclosure.
Figure 3C:
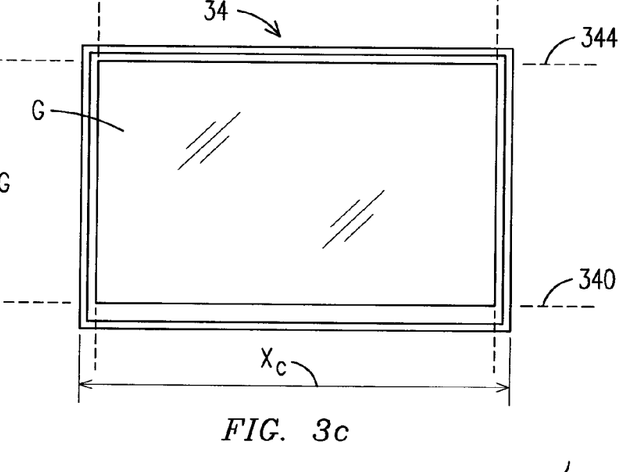
FIG. 3c illustrates a picture window functional unit according to the disclosure.
Figure 3D:
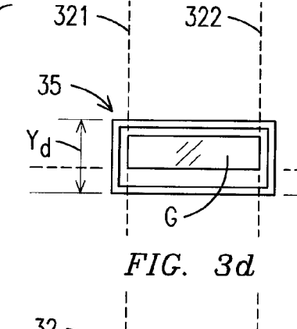
FIG. 3d illustrates a transom functional unit according to the disclosure.
Figures 3E, 3F:
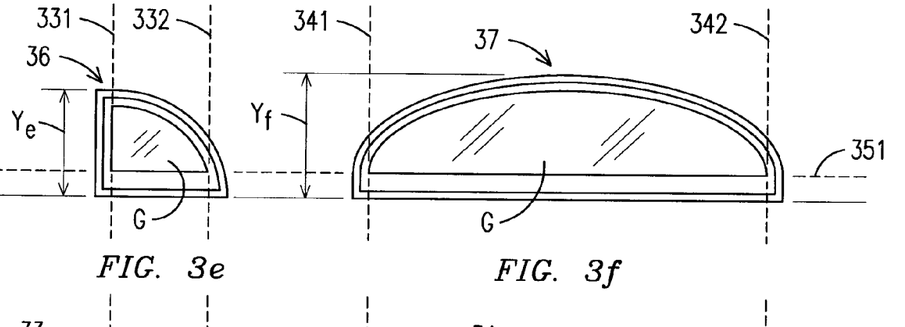
FIG. 3e illustrates an eyebrow functional unit according to the disclosure.
FIG. 3f illustrates an arched window functional unit according to the disclosure.

Common interfaces of the functional units may include a common coupling or mulling mechanism for connecting two or more functional units together to form a compound functional unit, typically a large multi-component window to be installed in a large exterior wall. In one embodiment, shown generally in FIG. 2, a first mulling strip 25 is attached to an edge of functional unit 22, and a second mulling strip 26, adapted to mate with the component 25, is attached to the facing edge of functional unit 24. The two mulling strips can then be coupled and locked together to combine the individual functional units into a compound functional unit comprising, in FIG. 2 for example, side-by-side double hung windows. In an alternative embodiment, the mulling system can be as simple as a spacer strip made of wood, a wood polymer composite, or other suitable material, with the functional units 22 and 24 being jointed together by screws or other fasteners installed through holes in a jamb of each functional unit, thereby coupling the functional units together.

Regardless of the method of mulling the functional units together, the spacing or gap between the individual units, and thus the final width (or height where one unit is mulled atop another) of the compound unit is determined by the width of each unit and the thickness of the spacer or coupling mechanism disposed therebetween. As discussed in more detail below, the spacer, be it a simple strip or a complex interconnecting mulling system, preferably is configured to provide gaps of a standard predetermined width between mulled functional units. In this way, a standardized sealing system can be installed in the gaps on the exterior side of the window to seal against rain, wind, and other intrusions. Gaps of substantially the same width also simplify the construction and installation of interior trim pieces that cover and conceal the gaps on the inside of a home. In addition, gaps of common width contribute to a unity of appearance in compound functional units that mimics the look of custom crafted windows.

It also is preferred that individual functional units be sized in such a way that the outer periphery of a compound functional unit assembled from multiple individual functional units defines a relatively continuous and smooth outline without significant discontinuities from one individual functional unit to the next. This feature, which lends a harmonious and unified appearance to the compound unit and simplifies interior and exterior trim components, will hereinafter be referred to as stepless transitions between individual functional units of a compound functional unit. For example, as illustrated in the left image of FIG. 3, stepless transitions occur when double hung functional unit 32 has the same width $X_a$ as transom unit 35. Thus, when the bottom of transom unit 35 is coupled to the top of double hung unit 32 to form a compound functional unit, there are stepless transitions between the individual functional units on both sides of the compound unit. Similarly, the middle image of FIG. 3 illustrates another possible compound functional unit made from an eyebrow unit 36 attached atop a sidelight or door unit 33. Again, the width Xb of the sidelight unit 33 and the corresponding eyebrow unit 36 is the same, thus producing a continuous outline and stepless transitions along the peripheral edges of the compound unit. The image on the right in FIG. 3 illustrates stepless transitions in a compound functional unit made up of a picture window unit 34 having an arched window unit 37 secured to its top. Both units have a width Xc that is substantially the same, resulting in a continuous outline and stepless transitions.

FIG. 3 also illustrates common sight lines among functional units of the system, according to the invention. Specifically, to the extent possible, the vertical edges of the glazing units G of the individual functional units of the system align with each other when one functional unit is attached atop another, as illustrated at 321, 322, 331, 332, 341, and 342 in FIG. 3. Similarly, the horizontal edges of glazing units G of individual functional units align when functional units are attached together side-by-side in a compound functional unit, as illustrated at 340, 344, and 351 in FIG. 3. The concept of common sight lines also includes the feature that corresponding lineal components of functional units of the system are, whenever possible, the same width. For instance, the bottom rails of the sashes of all primary units (double hung, casement, picture, etc.) are the same width and the side and top rails of the sashes have a common width, which may be different than the width of the bottom rail, throughout the collection. Enforcing common sight lines across the collection of functional units lends to the consistency and custom crafted appearance of compound windows made up of several individual functional units attached or mulled together side-by-side and/or top-to-bottom.

Figure 4A:
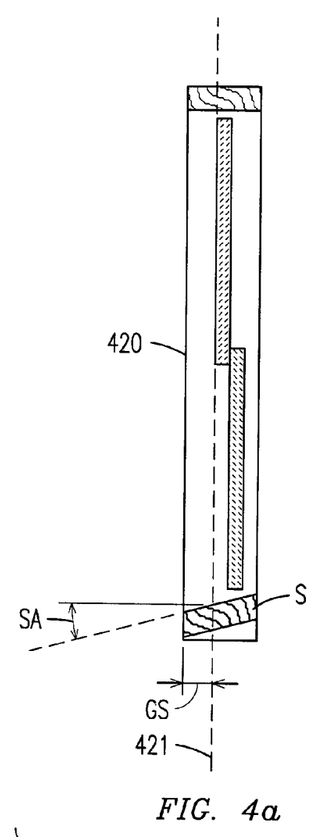
FIG. 4a illustrates a double hung functional unit with glass setback and sill design according to the disclosure.
Figure 4B:
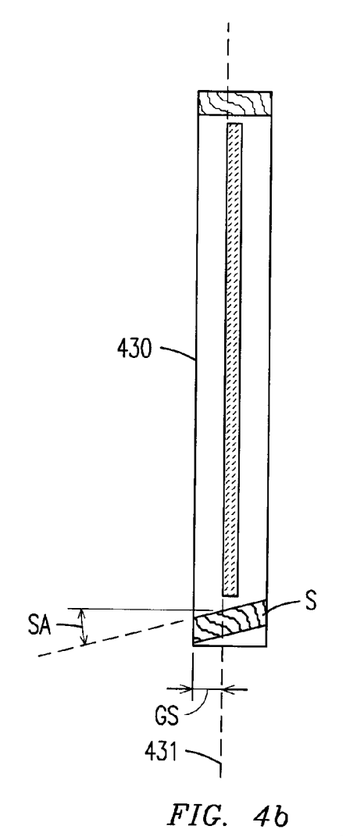
FIG. 4b illustrates a casement or awning window or a picture or fixed window functional unit with glass setback and sill design according to the disclosure.

FIG. 4 illustrates the feature of common glass setback across all functional units of the modular fenestration system. Referring to FIGS. 4a and 4b, glass setback refers to the distance S from the surface of the glazing unit in a functional unit to the outside edge of the frame of the unit. It will be noted that since double hung windows have glass in two different planes, they can have two glass setbacks. The left image in FIG. 4 is a cross section from the side of a double hung window functional unit showing a glass setback for the top sash of S. S is the distance between the outside edge 420 of the unit and the plane 421 of the glazing in the upper sash. Similarly, the right image in FIG. 4 is a cross section from the side of a casement or awning window or a picture or fixed window functional unit showing a glass setback of S. S is the distance between the outside edge 430 of the unit and the plane 431 of the glazing. According to the invention, all functional units of the system that are combinable into compound units have common glass setbacks S. In other words, the glazing of each functional unit of the system is set back the same distance from the outside edge of the unit as the glazing in all other functional units in the collection. With respect to double hung functional units, it has been found that enforcing the common glass setback of S for the glazing of the upper sash of the unit provides an architecturally consistent and visually pleasing result when double hung units are mulled together with other functional units of the system to form a compound unit. As with common sight lines, common glass setback results in compound functional units with a consistency of appearance reminiscent of custom craftsmanship, even though they are assembled from individual standardized and mass produced functional units.

Each of the functional units of the system further is constructed to exhibit common design language with all other functional units. Design language refers to the physical configurations, sizes, profiles, and shapes of a variety of elements of the functional units, and common design language means that these features are the same for all functional units of the collection. For example, each functional unit has side jambs and a head jamb made from lineals of the same size and same cross-sectional profile. Each has a sash angle (the angle of the bevel of the sash lineals where the sash meets the glazing) that is the same as the sash angle for all other functional units. Similarly, each primary functional unit of the system, where possible, has a tall bottom rail that is the same width as the bottom rails of other primary functional units. Each primary functional unit preferably has a sill that has the same slope and cross-sectional profile as the sills of all other primary functional units of the system, even for units where a sloped sill is not functionally required. For instance, in FIG. 4, the double hung functional unit on the left has a sill s with a slope sa and the fixed or casement unit on the right has a sill s with the same slope sa.

Figure 6:
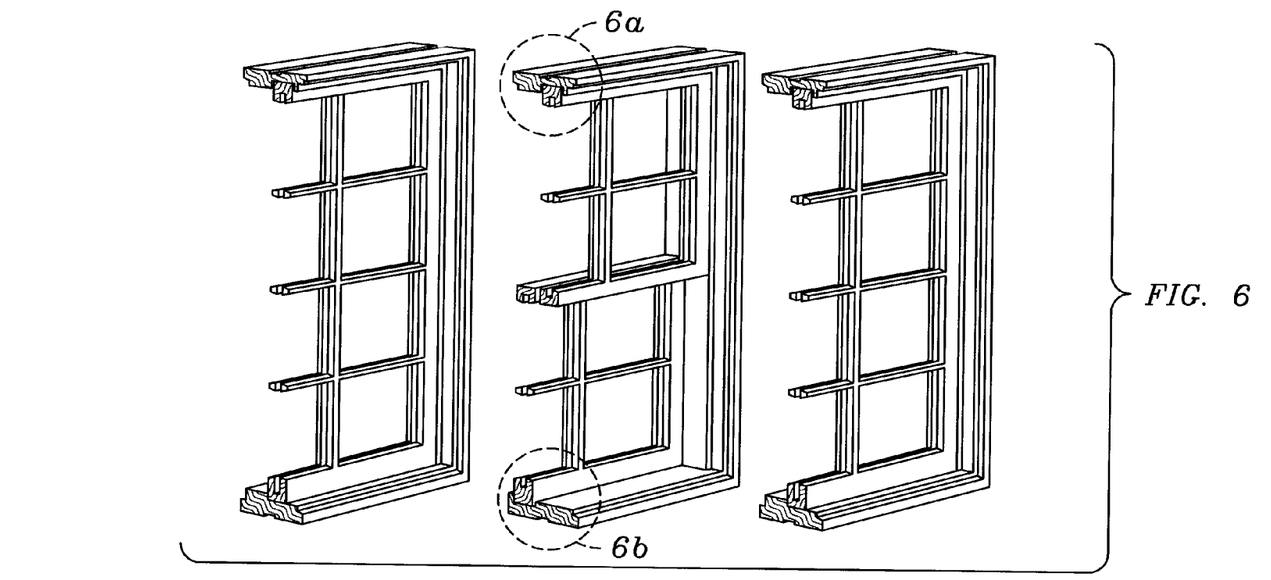
FIG. 6 is a perspective partially sectioned view of three exemplary functional units of the system illustrating common design language.
Figure 6A:
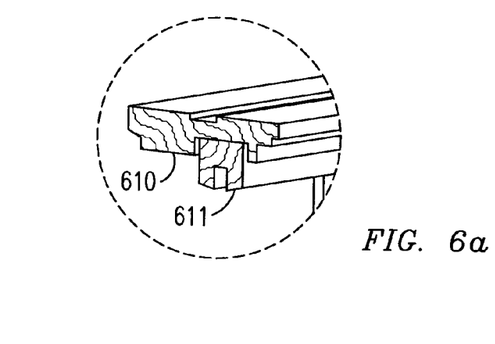
FIG. 6a is an enlarged view of a portion of a functional unit illustrating common design language.
Figure 6B:
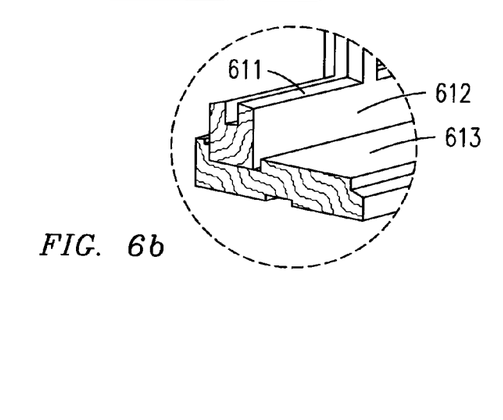
FIG. 6b is an enlarged view of another portion of a functional unit illustrating common design language.

Referring in more detail to FIG. 6, three functional units of a modular fenestration system according to the invention are illustrated, a picture window unit, a double hung window unit, and a casement window unit. The system obviously will comprise a number of other types of functional units, but these three are shown to illustrate better the common design language incorporated into the functional units. Whenever practical, the functional units of the system have jamb profiles 610, sash angles 611, tall bottom rails 612, sloped sills 613, and sill profiles that are the same. There may be exceptions such as, for instance, transom units and other specialty or secondary units, which likely do not include a sloped sill for architectural and functional reasons. This common design language contributes further the consistent, pleasing, and custom crafted look of compound fenestration units formed from combined individual functional units of the system. Significantly, it also enhances the ability to mass produce the functional units efficiently and economically because so many of the lineal sizes and profiles are common to all functional units of the system.

Figure 7:
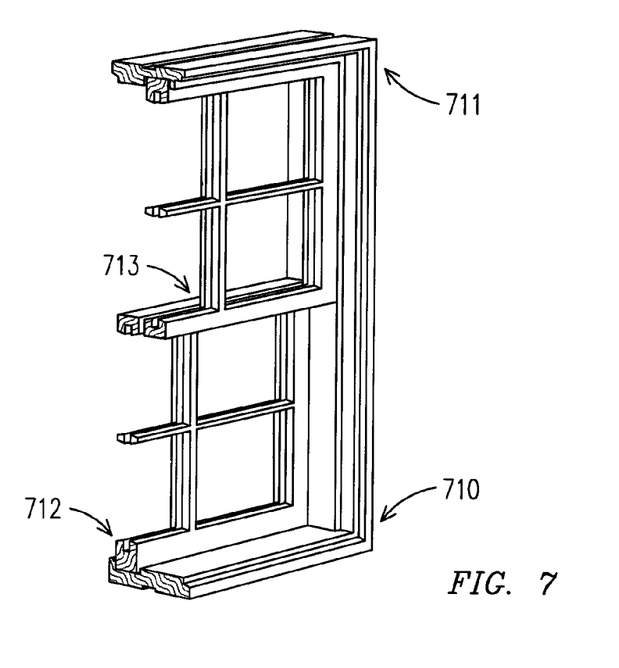
FIG. 7 is a perspective partially sectioned view of a double hung functional unit of the system illustrating common interfaces.

The functional units of the system are further configured with common interfaces, meaning that the various elements of the system that meet or join or are attached to other elements are secured in the same way using the same structures for all of the functional units of the system. For instance, the groove or other structure formed in the outside and inside edges of the jambs for receiving the attachment mechanism of trim units is common throughout the collection of functional units. Similarly, the attachment mechanism by which grille units are attached to sashes is the common to all functional units. And, as mentioned above, the mulling system by which functional units are joined together into compound units is common to all of the functional units of the system. FIG. 7 exemplifies common interfaces for a double hung functional unit of the system. Interfaces include, for instance, an exterior trim interface 710 designed to accept and secure a selected exterior trim unit of the system. Thus, an exterior trim unit of any architectural style can be attached to any individual functional unit of the system and to any compound functional unit made up of combined individual units. Of course, the attachment mechanisms of all of the exterior trim units of the system also are the same and designed to secure the trim units to the exterior trim interface 710 of the functional units.

Other common interfaces include the mulling interface 711 by which individual functional units are mulled together, the extension jamb interface 712 to which interior extensions or other trim is attached to the frame of the unit, and the grille interface 713 where the ends of the grille components are attached to the sash frames. Thus, all of the functional units of the collection are mulled together the same way with the same mulling interface, extension jambs attach to all of the functional units of the collection in the same way with the same interface, exterior and interior trim units of the system attach to the functional units and compound functional units in the same way, and grilles attach to the sash frames of all units in the same way. Common interfaces ensure that the functional units of the system can be assembled in a wide range of combinations to form a correspondingly wide range of compound units, since the units are all attached together with the same mulling system. Further, common interfaces insure that any of the architectural elements of the system, such as exterior trim units and grille units, can be selected and attached to any of the individual functional units of the system and to any compound functional unit that a designer might form from individual units. It can thus be seen that a very large array of possible combinations of elements of the system is available to an architect or designer without concern for whether each selected element is compatible with all of the other selected elements.

Another feature of the modular fenestration system is that the functional units of the system are dimensioned according to a universal size grid that is based on a common increment such as, for example, a 4 inch increment. Furthermore, as detailed below, the sizing refers not to the physical dimensions of the unit itself, but to the required size of the rough framed-in opening in which the unit fits. This means that a given functional unit type of the system can be ordered for rough opening dimensions (width and height) that vary in 4 inch increments and that virtually all functional units of the system are available for the same combinations of rough opening dimensions. For example, a double hung functional unit of the system may, for purposes of illustration only, be available for rough openings having widths of 20, 24, 28, 32, 36, or 40 inches and heights of 36, 40, 44, 48, 52, or 56 inches. A transom unit that may be selected to be mulled atop a double hung unit also is available for rough openings of the same set of incremental widths (20, 24, 28, 32, 36, or 40 inches). In this way, a compound functional unit made from a transom unit for a 30 inch wide opening attached atop a double hung unit for a 30 inch wide opening will exhibit stepless transitions, common sight lines, and the other advantageous features of the system of this invention.

It will be apparent that this incremental sizing Strategy for functional units will naturally result in a very large number of width and height combinations in which functional units are available to designers and builders. The system of this invention includes a unique strategy for specifying all of the unit types in all of the available sizes that is logical, meaningful, and conveys useful information immediately to designers, builders, and homeowners. More specifically, each functional unit is specified, selected, and ordered by a designation that embodies the type of unit and the rough opening in which it should be installed. For example, a double hung functional unit may be specified as a DH3664 unit, meaning that it is a double hung functional unit sized to be installed in a rough opening that is 36 inches wide by 64 inches high. Thus, all information necessary to order a needed functional unit is immediately conveyed by the designations of the functional units. It is thus a simple matter for a designer or builder to select and order functional units for a particular rough opening size, or to determine the needed rough opening size for a selected functional unit.

This specification strategy also applies to functional units that are not rectangular (e.g. an arched window unit, triangular window unit, eyebrow window unit, etc.). For example, an arched window unit may be designated as an AR7224 unit, meaning that it is an arched unit for a rough opening of 72 inches wide by 24 inches tall. Additional structural members may be secured within the rectangular rough opening in appropriate places to aid in attachment of the non-rectangular unit to the structure; however, the size of the needed rough opening is still the basic designation of the arched unit. Further, the AR7224 is immediately recognizable as the appropriate arched unit to be mulled atop a DH7280 or two side-by-side DH3680 units, for example. It can be seen that ordering a set of functional units that will match when mulled together into a larger composite functional unit becomes simple and straight forward for designers and builders. This is unique to the fenestration industry.

The actual peripheral dimensions of a functional unit, which are smaller than the dimensions of the required rough opening, are not immediately germane to home designers and architects and thus are not part of the specification strategy of this invention. However, for the manufacturer of the functional units, each unit's actual dimensions can readily be calculated from the width (W) and height (H) of the rough opening specification by subtracting gap widths, which also are standard for the system, from each of W and H. For example, the gap width used in such a calculation may be denoted by $g_w$, for the horizontal gap, and $g_v$ for the vertical gap. Gaps $g_w$ and $g_v$ are the horizontal and vertical distances between the edges of the rough opening and the closest points of a functional unit configured to be installed in the rough opening. Hence, the maximum horizontal dimension of the functional unit is $X=W-2g_w$, and the maximum vertical dimension of the functional unit is $Y=H-2g_v$. While in principle $g_w$ and $g_v$ can be different, it is convenient to let $g_w=g_v=g_p$, wherein $g_p$ is a standard gap width between the periphery of a functional unit and the rough opening, and is constant for the system. It may be assumed that the unit is centered in the rough opening, so $g_p$ is the same for all sides of the unit. Thus, for example, if $g_w=g_v=g_p=0.75$ inch, then the actual width X of a functional unit for a 24 inch wide rough opening is $24-2(0.75)=22.5$ inches. Likewise, the actual height Y for a 48 inch high rough opening is $48-2(0.75)=46.5$ inches.

When functional units are coupled or mulled together to form a compound functional unit, gaps exist between the coupled together units. The design of compound units and the rough openings needed to receive them is greatly simplified if a standard mulling gap, $g_m$, is created by the mulling system. Preferably, the mulling system for joining individual units to form compound units is configured to provide a constant gap width $g_m$ for all mulled gaps, both vertical and horizontal. This assures common sight lines and stepless transitions between units, as discussed above.

Judicious selection of $g_m$ and $g_p$ makes easy the determination of rough opening dimensions required for any compound functional unit made up of multiple individual functional units. More specifically, the required dimensions of the rough opening for a compound unit depend upon the number of individual units, u, that are combined in the horizontal direction, and the number of individual units, v, that are combined in the vertical direction. When u units are combined in the horizontal direction, the number of mulled gaps between these units is u−1. Similarly, the number of mulled gaps in the vertical direction is v−1. With the width of each mulled gap being $g_m$, the required horizontal and vertical rough opening dimensions for the compound unit are:

$$W = X_1 + X_2 + \ldots X_u + 2g_w + (u-1)g_m$$

$$H = Y_1 + Y_2 + \ldots Y_v + 2g_v + (v-1)g_m$$

These equations can be further simplified by letting $2g_w = 2g_v = g_m$ or in other words letting the mulled gaps be the same width as the sum of the peripheral gaps in the vertical and horizontal directions. With these simplifications, the above equations for the dimensions of the required rough opening for a compound functional unit may be presented as follows:

$$W = X_1 + X_2 + \ldots + X_u + u(g_m)$$

$$V = Y_1 + Y_2 + \ldots + Y_v + v(g_m)$$

But, X (the actual width of an individual functional unit)$=W-2g_w=W-g_m$, where W is the rough opening width required for the unit. Similarly, Y (the actual height of an individual functional unit)$=V-2g_v=V-g_m$, where V is the rough opening height required for the unit. Substituting in the forgoing equations, we obtain:

$$\begin{aligned} W &= (W_1 - g_m) + (W_2 - g_m) + \ldots + (W_u - g_m) + u(g_m) \\ &= W_1 + W_2 + \ldots + W_u - u(g_m) + u(g_m) \\ &= W_1 + W_2 + \ldots + W_u \end{aligned}$$

and $$\begin{aligned} V &= (V_1 - g_m) + (V_2 - g_m) + \ldots + (V_v - g_m) + v(g_m) \\ &= V_1 + V_2 + \ldots + V_v - v(g_m) + v(g_m) \\ &= V_1 + V_2 + \ldots + V_v \end{aligned}$$

It thus can be seen that with the dimensioning and designation strategy of the present invention, the rough opening dimensions W and V required to receive a compound functional unit made of individual mulled together functional units is simply the sum of the rough opening requirements of each individual unit joined in the horizontal direction and the sum of the rough opening requirements of each individual unit joined in the vertical direction respectively. For example, three DH2448 units mulled side-by-side require a rough opening 72 inches wide (24+24+24) by 48 inches high. Similarly, three DH2448 units side-by-side each having a TR2412 mulled atop it requires a rough opening 72 inches wide by 60 inches (48+12). Thus, with the dimensioning and specification system of this invention, determining the required rough opening size for a compound functional unit is a simple matter of adding together the horizontal part of the specification for all units mulled in in the horizontal direction and adding together the vertical part of the specification for all units mulled in the vertical direction. It has been found that a convenient value for the mulled gaps ($g_m$) is 0.75 inches, meaning that the peripheral gaps ($g_p$) are 0.375 inches. 0.5 inches has also been found suitable in some situations for the width of the mulled gaps with 0.25 being the width of the peripheral gap.

For architects and building designers, this designation system and its simplicity render the task of designing window openings for a home, both for individual and compound units, significantly less arduous than in the past. Assuming that x=y=4 inches, the designer of a building can readily determine, by simple calculation, alternative window designations of units that might be mulled into a compound unit suitable for the design of the home. For example, assume that an architect wishes to create a compound window unit with three side-by-side DH3248 units, each of which has a TR3216 mulled to its top. The rough opening size needed to accommodate such a compound unit is simply 96 inches wide (three times 32) by 64 inches high (48 plus 16). Alternatively, a rough opening can be specified with dimensions that are multiples of 4 (or 2 or another selected increment), and functional units from the system that, when mulled together, fit within the rough opening can easily be determined by their specifications. For instance, if a home has a rough opening 32 inches wide by 64 inches tall and a double hung window is desired for that opening, the designer or builder need only order a DH3264 functional unit. Similarly, a rough opening 64 inches wide by 64 inches high can accept two side-by-side DH3264 units.

Figure 5:
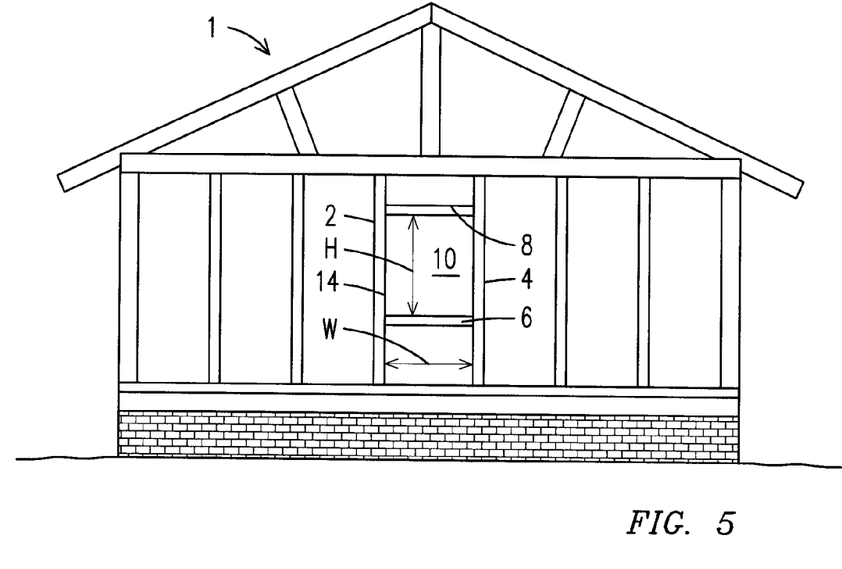
FIG. 5 illustrates a framed-in rough opening in a building for receiving a functional unit or a compound functional unit.

FIG. 5 is a simplified illustration of a portion of a framed-in building structure, in this case a house, illustrating what is meant by the term "rough opening" used herein. The house 1 is framed with a rough opening 10 formed by vertical studs 2 and 4 and horizontal studs 6 and 8. The rough opening 10 has an inside perimeter 14 with a width W, the distance between the vertical studs, and a height H, the distance between the horizontal studs. Other framing configurations also are used depending on factors such as the size of the opening, required structural support, and the configuration of the wall. Regardless of the configuration, the basic opening has an inside width W and an inside height H, which form the basis of the functional unit specification system discussed above.

Figure 8:
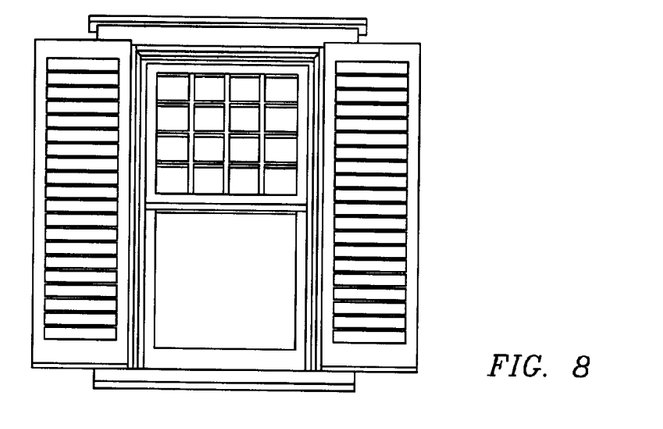
FIGS. 8-10 are perspective views of window units and illustrate application of three different architectural styles of trim to a double hung functional unit to create three distinct architectural statements.
Figures 9, 10:
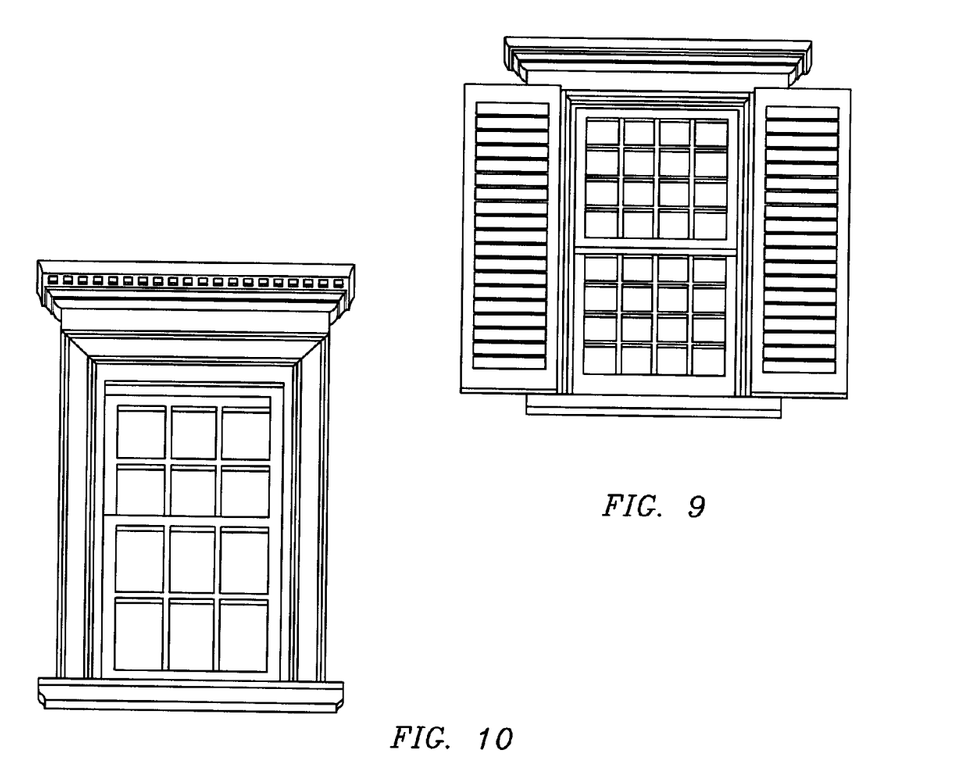

The modular fenestration system further includes a collection of architecturally and period accurate exterior trim, grille, and hardware units that can be attached to an individual functional unit, or to a composite unit made of several individual functional units, to achieve a desired architectural motif appropriate to the overall architecture of a home. FIGS. 8-10 show, for example, a double hung functional unit incorporating the above described attributes, with architecturally distinct trim units, grilles, and hardware of the system selected and attached to provide distinctly different impressions. FIG. 8 illustrates the impression created by selecting an exterior trim unit, a grille unit, and hardware exhibiting a Shingle architectural style. FIG. 9 illustrates the impression created with the same double hung functional unit by selecting and attaching an architectural trim unit exhibiting a Georgian Federal architectural style. And FIG. 10 illustrates the impression created by selecting trim, grille, and hardware units having a Colonial architectural style.

Figure 11:
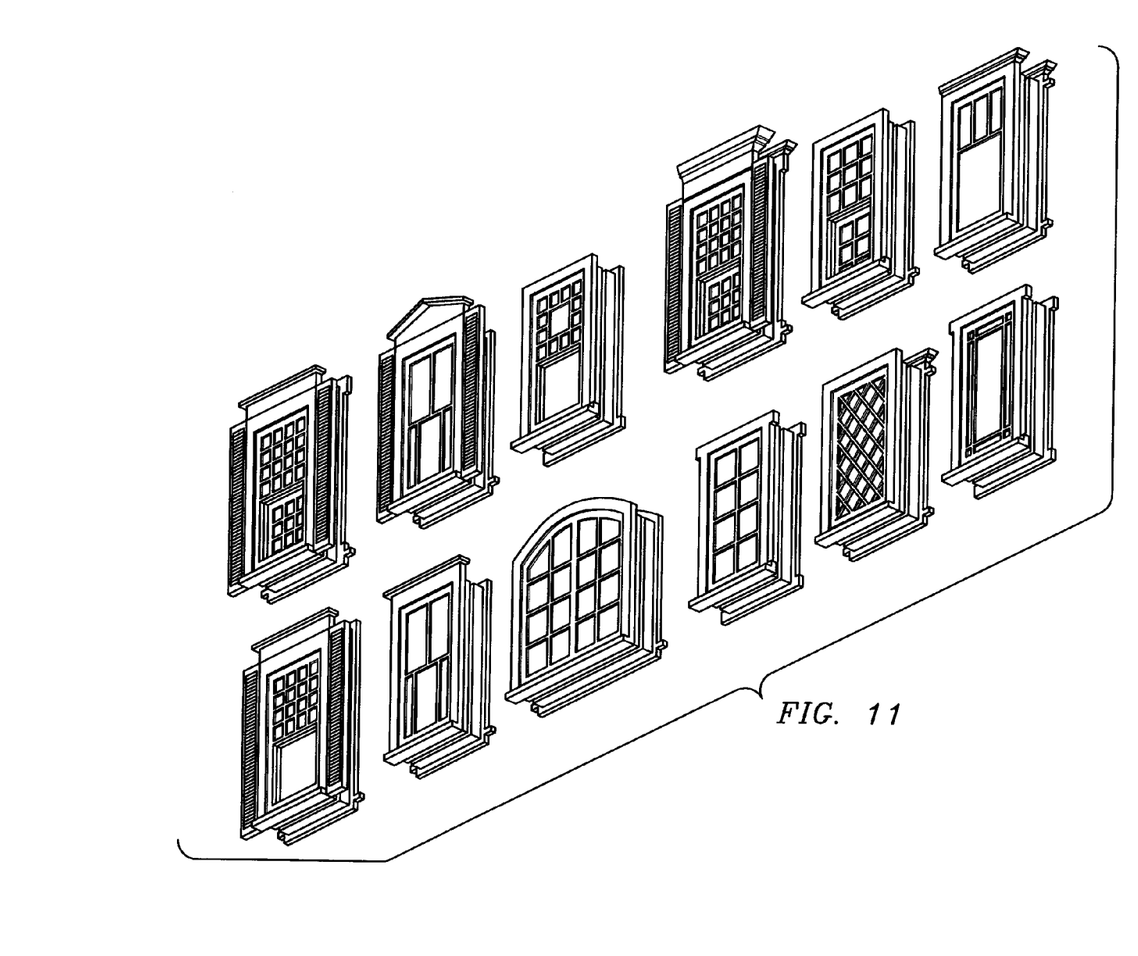
FIG. 11 illustrates a collection of possible architectural styles that might be made available in the modular fenestration system.

As can be seen from these figures, the identical functional unit combined with different architectural trims, grilles, and hardware of the system creates windows that have very different looks and feels and that make distinct architectural impressions. The system of the invention contemplates an available selection of trim (both exterior and interior), grille, and hardware units that is robust and includes many historical and period accurate architectures that may reasonably be desired. FIG. 11, for instance, illustrates a collection of exterior trim packages of varying architectural styles that might be available for selection by architects and designers within the system of the present invention. Of course, the invention is not limited to a particular architectural style or group of styles, or indeed to historical architectural styles. The architectural styles illustrated in FIGS. 8-11 are thus meant to be exemplary only and represent one possible selection of architectural styles that might be provided for trim, grille, and hardware within the system of the invention.

Figure 12:
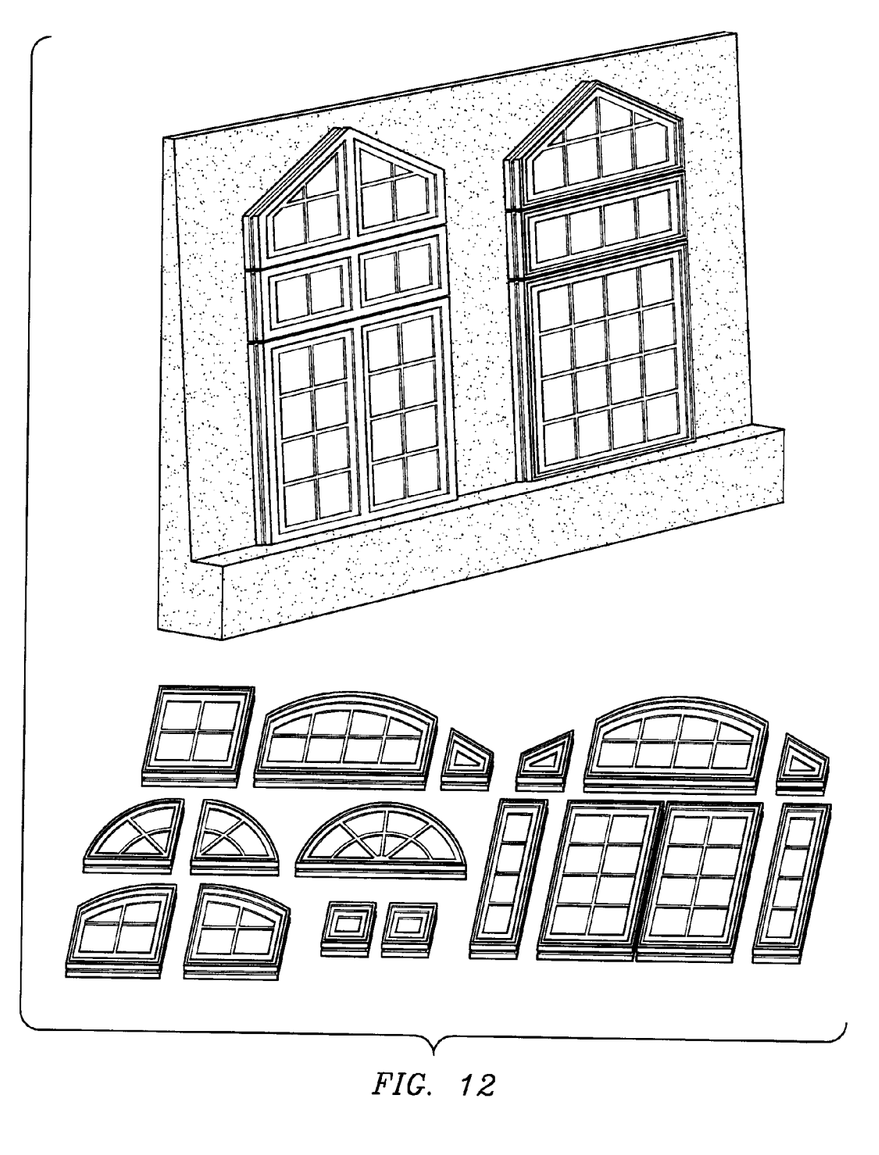
FIGS. 12-14 illustrate a design tool for use by architects and building designers to design compound functional units using individual functional units of the system.
Figure 13:
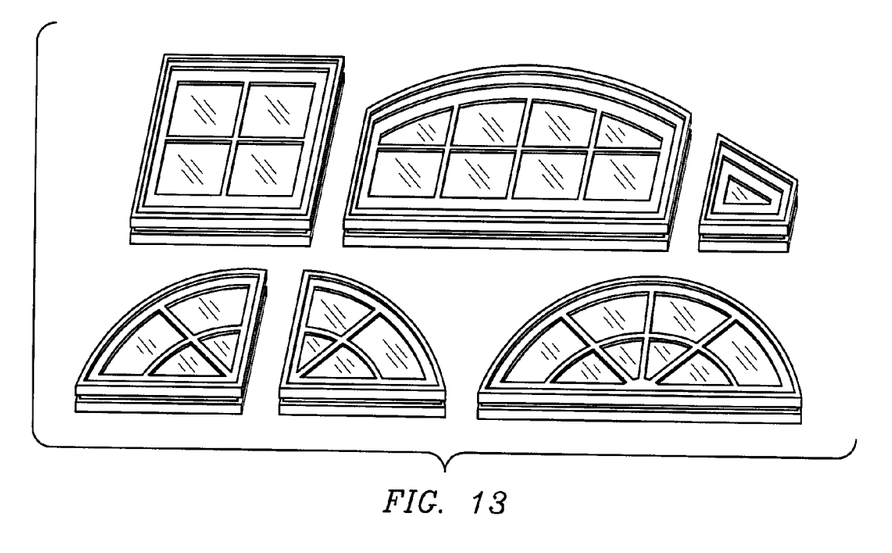
Figure 14:
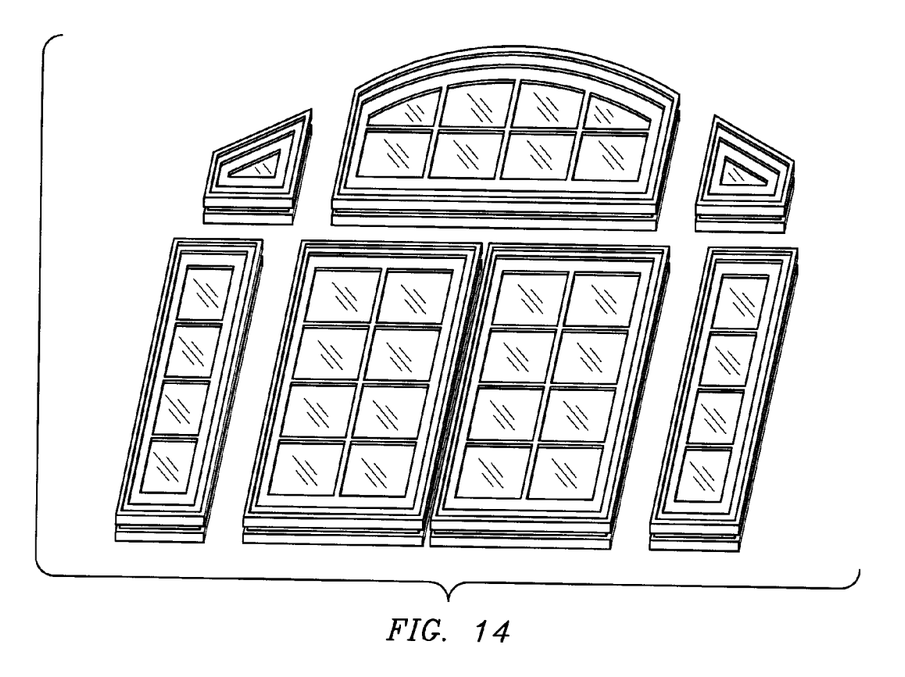

FIGS. 12 through 14 illustrate a design tool that is part of the modular fenestration system of the present invention to assist architects and designers in designing composite fenestration units by combining functional units of the system. The tool comprises small scale models of the functional units available in the system and an easel on which the functional unit models can be arranged in a wide variety of combinations to form models of composite functional units possible within the system. In FIG. 12, various model functional units comprising picture window units, double hung window units, arched window units, triangular window units, eyebrow units, and the like are shown in the foreground and the easel is shown in the background. Arranged on the easel are several model functional units forming two different composite window units. To the left on the easel are two side-by-side double hung units, a transom unit over each double hung unit, and a trapezoidal unit over each of the transoms to form a gable appearance at the top of the composite window unit. On the right are a single picture window unit, a single transom unit atop the picture window unit, and a single gable unit atop the transom, all forming a composite window unit having a distinctly different look and architecture than the composite unit on the left. Obviously, a vast array of composite units can be designed with this tool by combining the model functional units in their many possible combinations on the easel and comparing the resulting architectural impressions until the desired look is achieved. It should be noted, however, that some possible combinations are not visually pleasing and others are not functionally practical, so the number of viable possible combinations are more limited. It has been found that the design tool according to the invention makes designing and evaluating compound units substantially easier and produces more pleasing results than in the past, all made possible by the various components and elements of the system discussed in detail herein.

FIG. 13 is an enlarged view of some of the model functional units of the design tool, which represent actual functional units of a modular fenestration system according to the invention. The model functional units are accurate scale representations of the actual functional units so that the tool can be used to create realistic miniatures of actual composite window units. FIG. 14 illustrates another example of the combination of functional units of the system to form composite window units, using the tool of the invention. The illustrated composite unit here comprises two picture window units side-by-side, sidelight units to each side of the picture window units, an arched transom unit overlying the two picture window units, and trapezoidal transom units overlying the sidelight units. Such a combination might be assembled as, for example, a large arch-top picture window in a living room, bedroom, or other room.

The invention has been described in terms of preferred embodiments and methodologies considered by the inventors to represent the best mode of carrying out the invention. However, the embodiments presented are but examples and a wide variety of additions, deletions, and modifications might be made to the illustrated embodiments by skilled artisans without departing from the spirit and scope of the invention as set forth in the claims.

What is claimed is:

1. A method of specifying individual functional window units in a modular fenestration system that includes a collection of individual functional window units, the collection comprising functional window units of different configurations with each configuration comprising functional window units of different sizes, each respective configuration of the functional window units of different configurations having at least one physical attribute that is common to the functional window units of other configurations of the functional window units of different configurations, the method comprising the steps of establishing an array of roughed-in opening sizes that vary by a predetermined increment, sizing each of the functional window units of the collection to fit within a corresponding one of the roughed-in opening sizes of the established array, wherein the size of each functional window unit is different than the corresponding roughed-in opening size, and specifying each functional window unit of the collection by the roughed-in opening size in which it is sized to fit.

2. The method of claim 1, and further comprising specifying each window unit of the system by its configuration.

3. The method of claim 1, and wherein the predetermined increment is approximately 4 inches.

4. The method of claim 1, and further comprising the steps of mulling two or more window units together side-by-side to form a compound window unit and establishing a gap between the units that is predetermined so that the roughed-in opening size in the horizontal direction required for the compound window unit is the sum of the roughed-in opening size required for each individual window unit in the horizontal direction.

5. The method of claim 1, and further comprising the steps of mulling two or more window units together top-to-bottom to form a compound window unit and establishing a gap between the units that is predetermined so that the roughed-in opening size in the vertical direction required for the compound window unit is the sum of the roughed-in opening size required for each individual window unit in the vertical direction.

6. The method of claim 1, wherein each configuration comprises a type of window unit.

7. The method of claim 6, wherein at least one of the types of window units is a double hung window unit.

8. The method of claim 7, wherein at least one double hung window unit is sized to fit in an opening with a roughed-in size of a first quantity of units W in the width direction of the opening by a second quantity of units H in the height direction of the opening.

9. The method of claim 8, wherein the step of specifying each functional window unit comprises specifying the at least one double hung window unit by its type and the roughed-in opening size.

10. The method of claim 8, wherein the step of specifying each functional window unit comprises assigning the specification DHWH to the at least one double hung window unit where DH specifies a double hung window type, W specifies the width of the roughed-in opening in which the double hung window is sized to fit, and H designates the height of the roughed-in opening in which the double hung window is sized to fit.

\* \* \* \* \*

UNITED STATES PATENT AND TRADEMARK OFFICE
CERTIFICATE OF CORRECTION

PATENT NO. : 8,820,029 B2  
APPLICATION NO. : 13/897779  
DATED : September 2, 2014  
INVENTOR(S) : James B. Libby et al.

It is certified that error appears in the above-identified patent and that said Letters Patent is hereby corrected as shown below:

The following correction is on the title page of the patent under Assignee:

(73) Assignee: Anderson Corporation, Bayport, MN (US)

should read (73) Assignee: Andersen Corporation, Bayport, MN (US)

Signed and Sealed this
Eighteenth Day of November, 2014

Michelle K. Lee
*Deputy Director of the United States Patent and Trademark Office*